United States Patent Office

Re. 24,826
Reissued May 17, 1960

24,826

N-ALKYLPIPERIDYL ALKYNYLAMINES

John H. Biel, Milwaukee, Wis., assignor to Lakeside Laboratories, Inc., a corporation of Wisconsin No Drawing. Original No. 2,867,620, dated January 6, 1959, Serial No. 606,977, August 30, 1956. Application for reissue December 7, 1959, Serial No. 858,006

10 Claims. (Cl. 260—247.5)

Matter enclosed in heavy brackets [ ] appears in the original patent but forms no part of this reissue specification; matter printed in italics indicates the additions made by reissue.

This invention relates to novel chemical compounds and processes of preparing the same. More particularly, this invention is concerned with novel derivatives of acetylene.

There is provided according to the present invention novel aminoalkynyl derivatives of N-alkylpiperidines of the formula

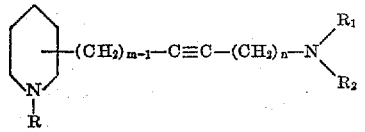

and acid addition and quaternary ammonium salts thereof, wherein m is an integer from 1 through 6, n is an integer from 1 through 5, R is a lower alkyl group and $R_1$ and $R_2$ are the same or different groups of the class consisting of lower alkyl groups, aryl groups, particularly monocyclic aryl groups such as the phenyl group, aralkyl groups, particularly monocyclic aryl-lower alkyl groups, and groups in which $R_1$ and $R_2$ are joined to form a ring, preferably a monocyclic ring with 5 or 6 atoms in the ring such as pyrrolidino, morpholino and piperidino.

These compounds may be conveniently prepared by contacting a reactive metal salt of an aminoalkyne with an N-alkyl halopiperidine or an N-alkyl-piperidylalkyl halide. This reaction may be represented as follows:

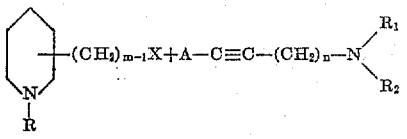

wherein m, n, R, $R_1$ and $R_2$ have the significance previously assigned, X is a reactive halogen, and A is a reactive metal.

Representative N-alkyl halopiperidines and N-alkyl-piperidylalkyl halides which may be used in the process are N-methyl-3-chloropiperidine, N-propyl-4-bromopiperidine, N-methyl-3-bromoethylpiperidine, N-ethyl-4-chlorobutyl-piperidine and the like.

Typical aminoalkynes which may be used in the form of reactive metal derivatives, such as the alkali metal salts, are 3-dimethylamino-1-propyne, 3-pyrrolidino-1-propyne, 3-morpholino-1-propyne, 3-diethylamino-1-propyne, 4-dimethylamino-1-butyne, 5-dibenzylamino-1-pentyne and 6-piperidino-1-hexyne.

The reaction is preferably effected by contacting the reactants in the presence of an inert solvent such as xylene, ethyl ether, or hexane. Elevated temperatures such as the reflux temperature are suitable for effecting the reaction. The reaction is terminated when essentially completed, which may take from about 1 to 20 hours, and the product recovered by conventional means from the reaction mixture.

Among the products which may be produced in this way from appropriate reactants are β-(3-diethylamino-1-propynyl) - N - methyl piperidine, β - (4 - morpholino-2-butynyl) - N - methyl piperidine, β - (3 - dimethylamino-1-propynyl)-N-methyl piperidine and γ-(6-pyrrolidino-3-hexynyl)-N-propyl piperidine.

Acid addition salts of the compounds provided by this invention are formed by contacting one mole of the base with one to two moles of an inorganic acid such as hydrochloric acid or sulfuric acid, or an organic acid such as maleic acid, fumaric acid, formic acid and citric acid.

Quaternary ammonium salts are produced by reacting the bases with alkyl, aralkyl, substituted aralkyl or alkynyl esters of inorganic and organic acids. The reaction preferably is effected in the presence of a suitable inert organic solvent. Methyl bromide, propargyl bromide, o-chlorobenzyl iodide, methyl chloride, benzyl chloride and methyl sulfate are representative compounds that may be used to form quarternary ammonium salts.

The non-toxic acid addition salts of the N-alkyl-piperidylalkynylamines are useful as diuretic agents in the treatment of congestive heart failure. The non-toxic quaternary ammonium salts are potent and long-acting hypotensive agents useful in the therapy of high blood pressure and peripheral vascular disease.

The following examples are presented to show methods of producing certain of the novel compounds included within this invention. It is understood, however, that these examples are included only for purposes of illustration, and that the invention is not to be restricted to the embodiments specifically disclosed therein.

EXAMPLE 1

β-(3-diethylamino-1-propynyl)-N-methyl piperidine

To 12 gm. (0.3 mole) of sodamide in 50 cc. of xylene was added 33 gm. (0.3 mole) of diethylaminopropyne. The mixture was heated at reflux for 1 hour and then 70 gm. (0.5 mole) of N-methyl-3-chloropiperidine was added. The mixture was refluxed for 20 hours. One hundred cc. of water was added to dissolve solids and the layers separated. The xylene layer was extracted three times with 150 cc. portions of dilute hydrochloric acid. The acid aqueous solution was washed three times with 50 cc. portions of ethyl ether, saturated with potassium hydroxide, and extracted three times with 150 cc. of ethyl ether. It was dried over potassium carbonate and the product recovered by vacuum distillation, B.P. 86–88° C./0.05 mm.; yield 80 gm., 77%.

Analysis.—Calcd. $C_{13}H_{24}N_2$: 13.46% N. Found: 13.23% N.

EXAMPLE 2

β-(4-morpholino-2-butynyl)-N-methyl piperidine

To 12 gm. (0.03 mole) of sodamide in 75 cc. of toluene was added 38 gm. (0.3 mole) of morpholino propyne. It was refluxed for 1 hour and 89 gm. of N-methyl-3-bromomethyl piperidine added. After refluxing for 20 hours the product was recovered as in Example 1, B.P. 107–110° C./0.07 mm.; yield 17 gm., 34%.

Analysis.—Calcd. $C_{14}H_{24}N_2O$: 11.86% N. Found: 11.81% N.

EXAMPLE 3

β-(3-dimethylamino-1-propynyl)-N-methyl piperidine

Sodium dimethylaminopropyne was reacted with N-methyl-3-chloropiperidine as in Example 1 to form this compound, B.P. 70–73° C./1.5 mm.

Analysis.—Calcd. 15.55% N. Found: 15.01% N.

EXAMPLE 4

β-(3-pyrrolidino-1-propynyl)-N-methyl piperidine

Sodium pyrrolidino propyne was reacted with N-methyl-3-chloropiperidine as in Example 1, B.P. 107–109° C./0.05 mm.

Analysis.—Calcd.: 13.59% N. Found: 13.54% N.

EXAMPLE 5

β-(3-morpholino-2-propynyl)-N-methyl piperidine

Sodium morpholino propyne was reacted with N-methyl-3-chloropiperidine as in Example 1 to produce this compound, B.P. 105–107° C./0.04 mm.

Analysis.—Calcd.: 12.61% N. Found: 12.51% N.

EXAMPLE 6

β-(4-diethylamino-1-butynyl)-N-methyl piperidine

Sodium diethylamino propyne and N-methyl-3-bromomethyl piperidine were reacted as in Example 1 to form this base; B.P. 88–90° C./0.3 mm.

Analysis.—Calcd.: 12.61% N. Found: 12.24% N.

EXAMPLE 7

β-(4-pyrrolidino-1-butynyl)-N-methyl piperidine

Sodium pyrrolidino propyne and N-methyl-3-bromomethyl piperidine when reacted as in Example 1 gave this compound; B.P. 95–98° C./0.5 mm.

Analysis.—Calcd.: 12.72% N. Found: 12.32% N.

EXAMPLE 8

β-(3-dimethylamino-1-propynyl)-N-methyl piperidine bis-hydrochloride

To 9 gm. (0.05 mole) of the base from Example 3 in 50 cc. of acetone was added ethyl ether and hydrochloric acid to pH 2–3. It was refrigerated overnight, filtered and dried, M.P. 193–194° C.

Analysis.—Calcd. $C_{11}H_{22}N_2Cl_2$: 11.06% N, 28.06% Cl. Found: 10.98% N, 26.92% Cl.

EXAMPLE 9

β-(3-dimethylamino-1-propynyl)-N-methyl piperidine bis-methobromide

To 18 gm. (0.1 mole) of the base from Example 3 in 50 cc. isopropanol was added 19 gm. (0.2 mole) of methylbromide. The mixture was allowed to stand at room temperature overnight, filtered and the product dried, M.P. 212–213° C.

Analysis.—Calcd. $C_{13}H_{26}N_2Br_2$: 7.56% N, 43.24% Br. Found: 7.45% N, 42.95% Br.

The following salts were also prepared:

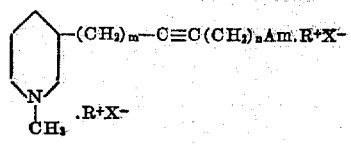

and

What is claimed is:

1. Di-lower alkyl-amino-lower alkynyl-N-lower alkyl piperidine.
2. β-(3-diethylamino-1-propynyl)-N-methyl piperidine.
3. β-(4-morpholino-2-butynyl)-N-methyl piperidine.
4. β-(3-dimethylamino-1-propynyl) - N - methyl piperidine.
5. β-(3-pyrrolidino-1-propynyl)-N-methyl piperidine.
6. β-(3-morpholino-1-propynyl)-N-methyl piperidine.
7. β-(4-diethylamino-1-butynyl)-N-methyl piperidine.
8. β-(4-pyrrolidino-1-butynyl)-N-methyl piperidine.
9. A member of the group consisting of compounds of the formulae

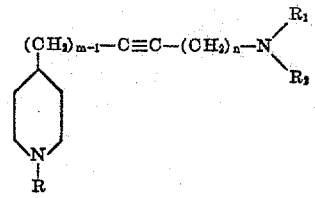

and

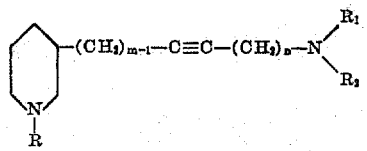

and non-toxic acid addition and non-toxic quaternary ammonium salts thereof, wherein m is an integer from 1 through 6, n is an integer from 1 through 5, R is a lower alkyl group and $R_1$ and $R_2$ are members of the group consisting of lower alkyl groups, and groups in which

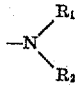

represents a member of the group consisting of the morpholino, pyrrolidino and piperidino groups, said quaternary salts containing a member of the group consisting of lower alkyl, lower alkynyl and phenyl-lower alkyl groups.

10. The process which comprises reacting a member of the group consisting of compounds of the formulae

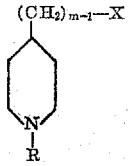

and

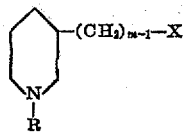

| Am | m | n | R | X | M.P., degrees | Yield, percent | Assay | | | |
|---|---|---|---|---|---|---|---|---|---|---|
| | | | | | | | Calcd. | | Found | |
| | | | | | | | Percent N | Percent X | Percent N | Percent X |
| $(C_2H_5)_2N$— | 0 | 1 | $CH_3$— | Br | 214–16 | 44 | 7.04 | 40.20 | 6.95 | 40.71 |
| Pyrrolidino | 0 | 1 | $CH_3$— | Br | 229–30 | 66 | 7.07 | 40.40 | 6.50 | 40.96 |
| Morpholino | 0 | 1 | $CH_3$— | Br | 212–13 | 86 | 6.79 | 38.83 | 6.67 | 38.74 |
| $(C_2H_5)_2N$— | 0 | 1 | $HC{\equiv}CCH_2$ | Br | [1] 80–85 | 92 | 6.28 | 35.87 | 6.15 | 35.48 |
| $(C_2H_5)_2N$— | 1 | 1 | $CH_3$— | Br | 155–59 | 69 | 6.79 | 38.83 | 6.43 | 36.44 |
| Pyrrolidino | 1 | 1 | $CH_3$— | Br | 100–102 | 85 | 6.82 | 39.02 | 6.55 | 36.41 |
| Morpholino | 1 | 1 | $CH_3$— | Br | 232–33 | 63 | 6.57 | 36.68 | 6.26 | 36.23 |

[1] Foam.

with a compound of the formula

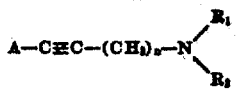

to produce the corresponding member of the group consisting of compounds of the formulae

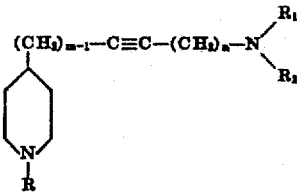

and

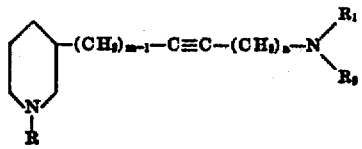

wherein, in each occurrence, m is an integer from 1 through 6, n is an integer from 1 through 5, R is a lower alkyl group and $R_1$ and $R_2$ are members of the group consisting of lower alkyl groups, and groups in which

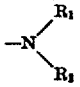

represents a member of the group consisting of the morpholino, pyrrolidino and piperidino groups, *X is a reactive halogen and A is a reactive alkali metal.*

References Cited in the file of this patent or the original patent

UNITED STATES PATENTS

| | | |
|---|---|---|
| 2,684,965 | Weston et al. | July 27, 1954 |
| 2,771,391 | Bockstahler | Nov. 20, 1956 |

OTHER REFERENCES

Profft: Chemische Technik, Die (Berlin), vol. 5, pp. 13–17 (1953).